Patented Dec. 6, 1938

2,139,390

UNITED STATES PATENT OFFICE 2,139,390

PROCESS OF MAKING CRYSTALLINE MENTHOL

Charles O. Terwilliger, Birmingham, Ala., assignor, by mesne assignments, to The First National Bank of Birmingham, Birmingham, Ala.

No Drawing. Application October 17, 1936, Serial No. 106,163

10 Claims. (Cl. 260—476)

My invention relates to a process for producing synthetic menthol conforming to natural menthol as described in U. S. Pharmacopoeia, (XI). Such menthol has a melting point of from 42° to 44° C., as compared with a melting point of 30° to 36° C. characterizing synthetic menthols heretofore produced commercially. Also, the menthol produced in accordance with this invention is optically active, having a specific laevo rotation, Na$_D$ line, of from 46° to 50°, as compared with the dextro rotatory, or optically inactive, menthols heretofore produced synthetically on a commercial basis.

The principal objects of my invention are to provide a process whereby increased yields of synthetic U. S. P. menthol may be produced; to provide a means whereby a greater percentage of the higher boiling l-menthol may be separated from a mixture of isomers; and to provide a process for the esterification of menthols from a mixture of isomers which shall proceed smoothly without producing an excess of side reactions.

It is known that the hydrogenattion of isopulegol produces a mixture of menthol isomers with a predominance of α-1-menthol. In my application Serial No. 102,981, filed September 28th, 1936, I have described and claimed a method of producing isopulegol. Preferably, in carrying out my present invention, isopulegol produced according to the aforesaid application, or any other suitable process, is hydrogenated by known methods to produce crude menthol which is the mixture of isomers heretofore mentioned, together with other reaction products, or impurities. The material thus produced is a liquid and it is preferable to remove the impurities before separating the isomeric menthols.

I have found that by careful fractionation of the crude menthol, I am able to remove practically all of the impurities and can also concentrate, to a large extent, the 42° to 44° C. melting point α-1-menthol. While not absolutely essential to the production of such menthol, I have found that greater yields may be thus obtained. At 10 mm. pressure and with an efficient fractionating column, I have found that the 42° to 44° melting point α-1-menthol is concentrated in the fraction boiling from 96° to 98° C. inclusive. This fraction, at 62° F., freezes slowly to a mass of crystals. The crystals thus produced, when well centrifuged, will be found to have a melting point of around 34° C., have a laevo rotation to nearly 48°, and have an odor very similar to the 42° to 44° melting point menthol. This 34° melting point menthol, however, I have found to be a mixture of two laevorotatory menthols, one melting at from 42° to 44° C., and the other at 28° to 32°, depending upon how well the separation is carried out, which method of separation will presently be described.

In attempting to separate the two menthols just described, I have found that it is preferable first to esterify, selecting an esterifying agent such as to produce crystalline esters with melting points fairly well apart so that they may be more easily separated. Also, the esterifying agent should be one which is not harsh in its action, otherwise an excess of degradation products of menthol will be produced, with consequent loss of material.

In my investigation of the problem, I have found that esterification can be more smoothly carried out, with a minimum of loss, by cross esterification, employing a benzoic acid ester of an alcohol of relatively low molecular weight, such as ethyl benzoate, and an alkali alcoholate as esterification agents. In this reaction, the alcohol of the ethyl benzoate changes places with the heavier molecular weight alcohol, menthol, resulting in menthyl benzoate and ethyl alcohol as byproducts contaminated with the small amount of alkali methylate used as a catalyst. Out of the mixture of menthyl benzoates thus produced, there may be crystallized an ester having a melting point of from 53° to 54° C., which corresponds to laevorotatory menthol having a melting point of 42° to 44° C.

Following is an example illustrating this step of my improved process: To one kg. of crude menthol fraction obtained as before described, I add one kg. of ethyl benzoate, heating the mixture to about 60° C. with good agitation. Sodium methylate is prepared by dissolving about 2 grams of sodium in 17.5 grams of methyl alcohol. The sodium methylate thus prepared is added to the mixture of crude menthol and ethyl benzoate slowly, beginning when the temperature of the mixture has reached 60° C. and continually agitating. The whole of the sodium methylate is added in a period of about one hour, during which time the temperature of the mixture should have reached about 90° C. The temperature of the mix is continually raised until it reaches about 150° C. in approximately one and one-half hours, at which time the reaction should be complete.

With larger batches of material, the time consumed, as is well understood, will vary. The mixture should be agitated continuously until the reaction is complete. Other alkali alcoholates, such as sodium or potassium ethylate, may be employed as catalysts in carrying out the reaction. Sodium methylate is mentioned in the above example for the reason of its cheapness and convenience.

With the rise of temperature to 150°, the major portion of the freed alcohol will be distilled off. The temperature is then allowed to drop and about 10 mm. vacuum is applied to distill off the remaining portion of the alcohol and the mixture of ethyl benzoate and menthol which has not gone into the reaction. The mixture is then allowed to cool. At room temperature crystals of menthyl benzoate separate out which have a melting point of from 51° to 53° C., and which correspond to menthol having a melting point of from 42° to 44°. These crystals are separated and the remaining mixture chilled to −10° C., when more menthyl benzoate crystals are deposited.

The crystals thus obtained may be saponified by any known methods. I have successfully saponified such crystals by adding to the menthyl benzoate crystals half their weight of a 50% aqueous sodium hydroxide solution and half their weight of ethyl alcohol. The mixture is boiled with a reflux condenser until the hydrolysis is complete. The alcohol is distilled off and the residue is then cooled and washed until neutral, then redistilled and the menthol crystallized.

The menthyl benzoate from which all of the solid product has been removed by crystallization is hydrolized in substantially the same manner as the crystalline menthyl benzoate, although I have found a somewhat longer time is required. At the completion of the hydrolysis the product is washed until neutral and finally distilled which results in a crystalline active menthol having a melting point of 28° to 32° C. and a rotation of −40° to −48° C. Of course, both the rotation and the melting point depend on how well the hydrolyzed material has been fractionated. There is also left a very small quantity of liquid residue having a slight peppermint odor, but this apparently is not menthol.

From the foregoing it will be apparent that I have devised an improved method of producing U. S. P. menthol, which is simple and effective, and one which may be carried out with a minimum loss of material and a minimum formation of degradation products. It will also be apparent that, while my improved process is directed particularly to the formation of U. S. P. menthol, the steps employed may be applied with equal benefit to the production of menthols other than the particular high melting point laevorotatory menthol specified in the U. S. Pharmacopoeia.

While I have described but one method of carrying out my invention, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The method of making laevorotatory high melting point menthol which comprises hydrogenating isopulegol to form a mixture of isomeric menthols, esterifying the mixture, fractionally crystallizing the esterified isomers, and separately saponifying the higher melting point crystalline esters.

2. The method of producing 1-menthol having a melting point of from 42° to 44° C., which comprises hydrogenating isopulegol, esterifying to form benzoic esters of the isomeric menthols, separating the esters, and saponifying the ester of the menthol sought.

3. The method of producing 1-menthol having a melting point of 42° to 44° C., which comprises hydrogenating isopulegol to form a mixture of isomeric menthols, fractionally distilling the mixture, esterifying the fraction distilling from 96° to 98° C. to form a mixture of 1-menthyl benzoates, separating the esters thus formed, and saponifying the higher melting point esters.

4. The method of producing 1-menthol having a melting point of from 42° to 44° C., which comprises hydrogenating isopulegol to form a mixture of isomeric menthols, fractionally distilling, subjecting the fraction distilling from 96° to 98° C. to the action of a benzoic ester of ethyl alcohol and an alkali metal alcoholate to form menthyl benzoate, fractionally crystallizing the menthyl benzoate, and saponifying the higher melting point esters.

5. The method of producing 1-menthol having a melting point of from 42° to 44° C., which comprises hydrogenating isopulegol to form a mixture of isomeric menthols, fractionally distilling, subjecting the fraction distilling from 96° to 98° C. to the action of ethyl benzoate and sodium methylate to form menthyl benzoate, fractionally crystallizing the menthyl benzoate, and saponifying the higher melting point esters.

6. In a process of producing synthetic menthol esters, the steps which comprise reacting a mixture of isomeric menthols with a benzoic ester of ethyl alcohol in the presence of an alkali metal alcoholate as a catalyst, and heating to drive off the freed alcohol and agitating the mixture while the reaction is going on.

7. In a process of producing menthol esters, the step which comprises esterifying a mixture of isomeric menthols by subjecting them to the action of ethyl benzoate and an alkali metal alcoholate, and heating during the reaction to drive off the freed alcohol.

8. In a process of producing menthol esters, the steps which comprise adding to a mixture of isomeric menthols an equivalent amount of ethyl benzoate with a relatively small amount of sodium methylate as a catalyst, heating and agitating to bring about a cross esterification of the mixture, and distilling off the freed alcohol.

9. In a process of producing U. S. P. menthol, reacting a mixture of liquid menthol and an equal weight of ethyl benzoate in the presence of an alkali metal alcoholate as a catalyst, agitating and slowly heating the mixture until it reaches a temperature of around 150° C., crystallizing out the ester melting at 53° to 54° C., and saponifying to form menthol having a melting point of from 42° to 44° C.

10. In a process of producing U. S. P. menthol, reacting a mixture of liquid menthol boiling from 96° to 98° C. and an equal weight of ethyl benzoate in the presence of an alkali metal alcoholate as a catalyst, agitating and slowly heating the mixture until it reaches a temperature of around 150° C., crystallizing out the ester melting at 53° to 54° C., and saponifying to form menthol having a melting point of from 42° to 44° C.

CHARLES O. TERWILLIGER.